(12) United States Patent
Nishikawa et al.

(10) Patent No.: US 12,115,455 B2
(45) Date of Patent: Oct. 15, 2024

(54) INFORMATION PROCESSING DEVICE AND INFORMATION PROCESSING METHOD

(71) Applicant: Sony Interactive Entertainment Inc., Tokyo (JP)

(72) Inventors: Yohei Nishikawa, Tokyo (JP); Benedikt Neuenfeldt, Tokyo (JP); Takahisa Ishikawa, Tokyo (JP); Steven Trombetta, San Francisco, CA (US); Adil Sherwani, Oakland, CA (US); Nobukazu Koyama, Tokyo (JP); Akihiko Kusumoto, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 121 days.

(21) Appl. No.: 17/436,828

(22) PCT Filed: Mar. 11, 2020

(86) PCT No.: PCT/JP2020/010621
§ 371 (c)(1),
(2) Date: Sep. 7, 2021

(87) PCT Pub. No.: WO2020/189449
PCT Pub. Date: Sep. 24, 2020

(65) Prior Publication Data
US 2022/0176253 A1 Jun. 9, 2022

Related U.S. Application Data

(60) Provisional application No. 62/819,720, filed on Mar. 18, 2019.

(51) Int. Cl.
*A63F 13/69* (2014.01)
*A63F 13/35* (2014.01)
*A63F 13/79* (2014.01)

(52) U.S. Cl.
CPC .............. *A63F 13/69* (2014.09); *A63F 13/35* (2014.09); *A63F 13/79* (2014.09)

(58) Field of Classification Search
None
See application file for complete search history.

(56) References Cited

U.S. PATENT DOCUMENTS

| | | | |
|---|---|---|---|
| 7,892,092 B2 | 2/2011 | Matthews |
| 8,328,643 B1 | 12/2012 | Osvald |

(Continued)

FOREIGN PATENT DOCUMENTS

| | | |
|---|---|---|
| CN | 101099179 A | 1/2008 |
| CN | 104066485 A | 9/2014 |

(Continued)

OTHER PUBLICATIONS

International Search Report for corresponding PCT Application No. PCT/JP2020/010621, 6 pages, dated Jun. 16, 2020.

(Continued)

*Primary Examiner* — Damon J Pierce
(74) *Attorney, Agent, or Firm* — Matthew B. Dernier, Esq.

(57) ABSTRACT

In the case where an event occurs in game software being executed, an event information acquiring section acquires, from the game software, event information including an event code that identifies the event that has occurred. An update processing section updates a record associated with the acquired event information in a first memory. A transmission processing section sends the acquired event information from a communication unit to outside.

4 Claims, 4 Drawing Sheets

(56) References Cited

U.S. PATENT DOCUMENTS

| | | | |
|---|---|---|---|
| 8,986,123 B2 | 3/2015 | Satake | |
| 10,406,443 B2 | 9/2019 | Imai | |
| 2003/0069053 A1* | 4/2003 | Dovgan | A63F 13/65 463/6 |
| 2006/0160620 A1 | 7/2006 | Matthews | |
| 2013/0035165 A1 | 2/2013 | Satake | |
| 2013/0079075 A1* | 3/2013 | Osvald | A63F 13/87 463/7 |
| 2013/0281201 A1 | 10/2013 | Kosuge | |
| 2014/0349753 A1 | 11/2014 | Kenichi | |
| 2017/0312629 A1 | 11/2017 | Kosuge | |

FOREIGN PATENT DOCUMENTS

| | | | |
|---|---|---|---|
| EP | 3028751 A2 | | 6/2016 |
| JP | 2010123126 | * | 12/2011 |
| JP | 2011245124 A | | 12/2011 |
| JP | 2013031610 A | | 2/2013 |
| JP | 2013223601 A | | 10/2013 |
| JP | 2016097089 A | | 5/2016 |
| JP | 2018064709 A | | 4/2018 |
| JP | 6416365 A | | 10/2018 |

OTHER PUBLICATIONS

"Lord of Arkana" Weekly Famitsu, vol. 25, No. 41, 6 pgs. Sep. 30, 2010.
"Monster Strike" Strongest Strategy Book 4, Takarajimasha Inc., 1st printing, 4 pgs, Jul. 9, 2015.
Office Action for corresponding CN Application No. 202080020437. 5, 14 pages, dated Dec. 20, 2023.

* cited by examiner

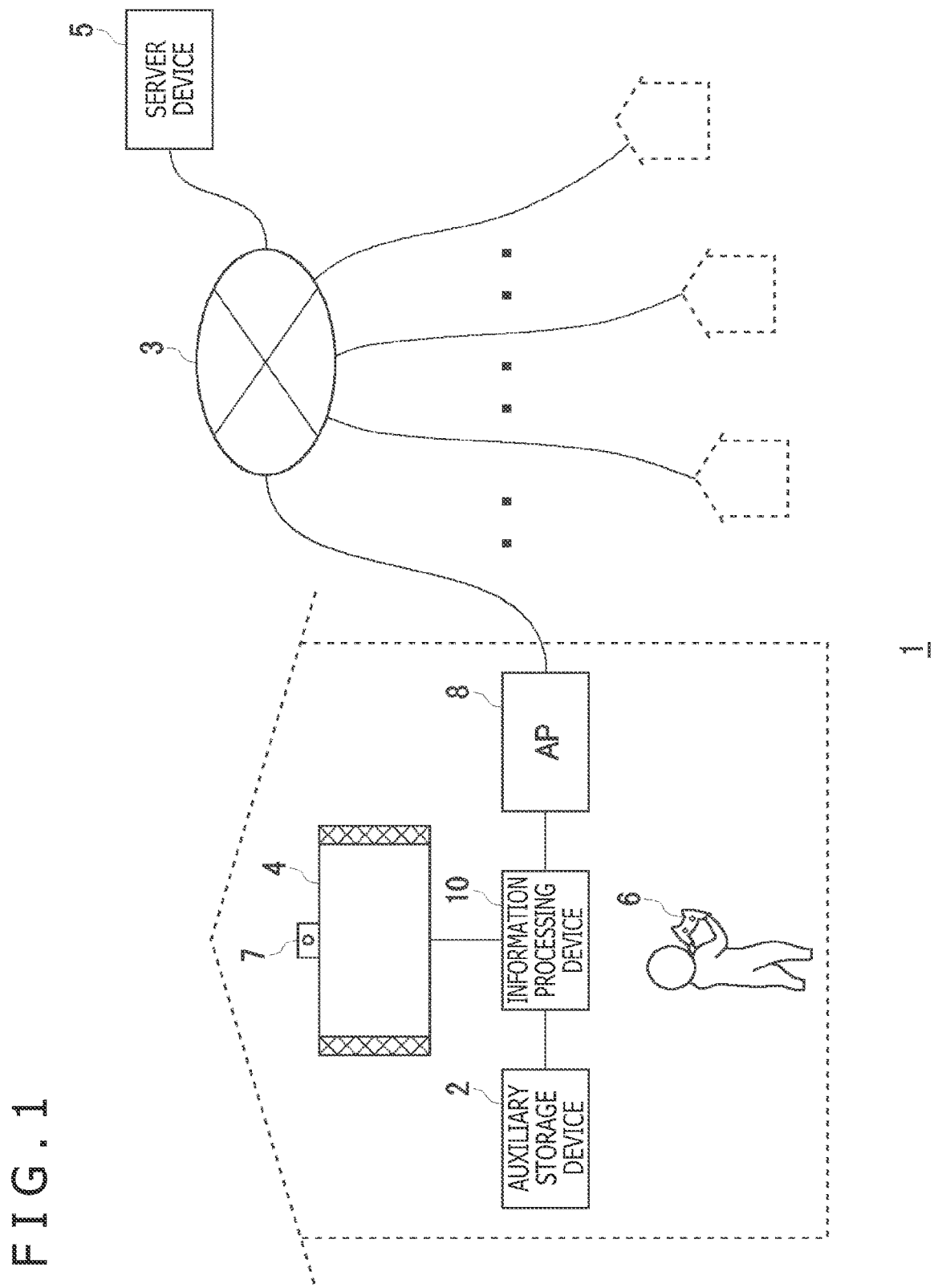
F I G. 1

FIG.4

| stats ID | TITLE | VALUE |
|---|---|---|
| 1 | GREETING | 5 |
| 2 | DEFEATING ENEMY | 28 |
| 3 | EXPERIENCE VALUE | 95287 |
| ... | ... | ... |

140

INFORMATION PROCESSING DEVICE AND INFORMATION PROCESSING METHOD

TECHNICAL FIELD

The present invention relates to a technology for managing events that occur in a game.

BACKGROUND ART

For the purpose of providing a motivation for playing games, it has been customary to give a user virtual awards for various missions in a game when the user has accomplished those missions. PTL 1 discloses a game system in which when game software determines that a mission in game play is cleared, a trophy ID for the mission is given to a trophy management utility. Virtual awards are called "trophies," and bronze, silver, and gold trophies are given to the user depending on the difficulty level of missions.

CITATION LIST

Patent Literature

[PTL 1] JP 2016-97089A

SUMMARY

Technical Problem

In recent years, there have been in widespread use cloud game services in which operating information entered by a user for a game is sent to a game server, and the game server generates video and audio data of the game according to the operating information and sends the generated video and audio data to a terminal device of the user. According to the cloud game services, since the game server manages all the game play, the game server can analyze user's play details after the game play is ended and make them useful for improving the game scenario.

In current console games, since information representing game play details is not output to outside, the actual play details of the user cannot be analyzed and potential needs of the user cannot be extracted. For example, PTL 1 discloses a game system in which a trophy ID for a mission that has been cleared is given to system software. However, the system software only grasps date and time information regarding the trophy acquired by the user, and is unable to obtain other information.

It is therefore an object of the present invention to realize an arrangement for acquiring various items of information in a game.

Solution to Problem

In order to solve the above problem, there is provided in accordance with an aspect of the present invention an information processing device including an event information acquiring section that, in a case where an event occurs in game software being executed, acquires, from the game software, event information including an event code that identifies the event that has occurred, an update processing section that updates a record associated with the acquired event information, and a transmission processing section that sends the acquired event information to outside.

In accordance with another aspect of the present invention, there is provided an information processing method including a step of acquiring, from game software being executed, event information including an event code that identifies an event that has occurred, a step of updating a record associated with the acquired event information, and a step of sending the acquired event information to outside.

Any optional combinations of the above components and expressions of the present invention as they are converted into methods, devices, systems, recording mediums, computer programs and the like are also effective as aspects of the present invention.

BRIEF DESCRIPTION OF THE DRAWINGS

FIG. 1 is a diagram illustrating an information processing system according to an embodiment of the present invention.

FIG. 4 is a diagram illustrating an example of a stats table.

DESCRIPTION OF EMBODIMENT

Figure 2:
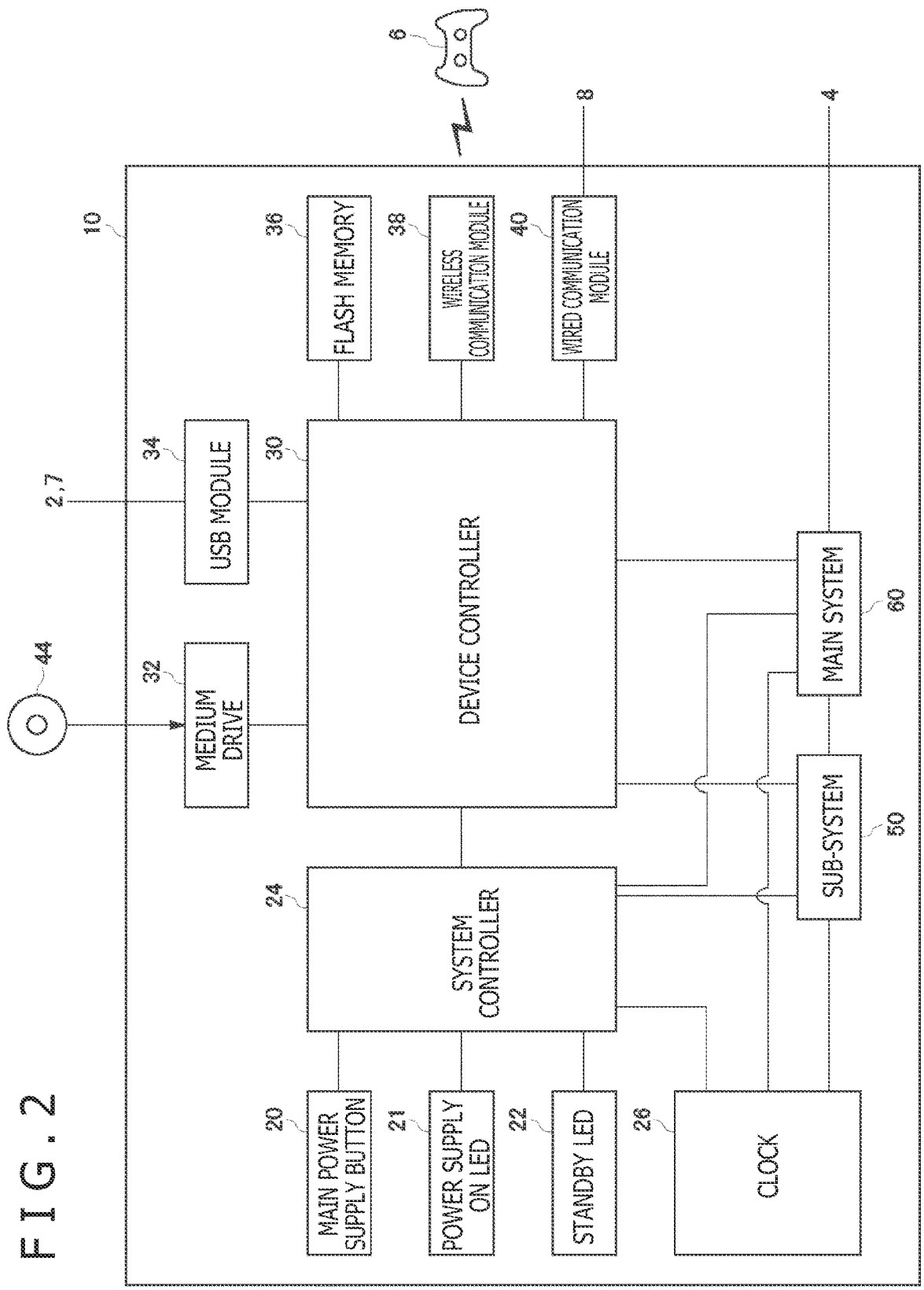
FIG. 2 is a diagram illustrating a hardware structure of an information processing device.

First, the outline of the present invention will be described below. In an information processing system according to an embodiment of the present invention, a user plays game software, i.e., a console game, installed in an information processing device. When an event occurs in the game, the game software outputs event information including an event code that identifies the event that has occurred to system software. An event occurs when the progress of game play changes or when the behaviors of a player character and a game character change. The system software outputs the event information output thereto to an external server device. The server device collects event information sent from a plurality of user terminal devices and uses the collected event information for analyzing playing tendencies of the users and improving the game scenario.

Various missions are established in a game. When a mission is cleared, a virtual award, i.e., a trophy, for the mission is given to the user. Since a clearing condition for a mission is a play condition for releasing a trophy to the user, the clearing condition will hereinafter also be called an "unlocking condition" for a trophy. Events of at least some kinds are related to an unlocking condition for a trophy.

In conventional game systems, game software determines whether an unlocking condition for a trophy is satisfied. In a game system according to the embodiment, game software outputs event information, and system software determines whether an unlocking condition for a trophy is satisfied.

FIG. 1 illustrates an information processing system 1 according to an embodiment of the present invention. The information processing system 1 may be a game system including an information processing device 10 as a user terminal device and a server device 5. An access point, hereinafter referred to as "AP," 8 has the functions of a wireless access point and a router. The information processing device 10 is connected to the AP 8 through a wireless or wired link and to the server device 5 on a network 3 for communication therewith.

The information processing device 10 is connected to an input device 6 operated by the user through a wireless or wired link. The input device 6 outputs operating information entered by the user to the information processing device 10. When the information processing device 10 receives the operating information by the input device 6, the information processing device 10 reflects it in the processing of system software and game software, and causes an output device 4 to output a processed result. In the information processing system 1, the information processing device 10 may be a game device, i.e., a game console, for performing a game, and the input device 6 may be a device for supplying operating information from the user to the information processing device 10 that may be a game controller or the like. The input device 6 may be an input interface such as a keyboard, a mouse, or the like.

An auxiliary storage device 2 may be a mass storage device such as an HDD (Hard Disk Drive), a flash memory, or the like, and may be an external storage device connected to the information processing device 10 by a USB (Universal Serial Bus) or may be a built-in storage device. The output device 4 may be a television set having a display for outputting images and speakers for outputting audio information, or may be a computer display. The output device 4 may be connected to the information processing device 10 by a wired cable or a wireless link.

A camera 7 as an image capturing device is disposed near the output device 4, and captures images of a space around the output device 4. In FIG. 1, the camera 7 is illustrated as being mounted on an upper portion of the output device 4. However, the camera 7 may be disposed on a side portion or lower portion of the output device 4. At any rate, the camera 7 is disposed in a position for capturing images of the user positioned in front of the output device 4. The camera 7 may be a stereo camera.

The server device 5 provides network services to users of the information processing system 1. The server device 5 manages network accounts that identify the users. Each of the users signs in the network services provided by the server device 5, using its network account. By signing in the network services from the information processing device 10, the user can register saved data for a game and trophies as virtual awards obtained during game play in the server device 5. With the saved data and the trophies registered in the server device 5, the user can synchronize the saved data and the trophies even if the user uses an information processing device different from the information processing device 10.

The server device 5 according to the embodiment collects event information produced during game play from the information processing device 10. The server device 5 can analyze a playing tendency of the user from the event information and hence can acquire information as to how those many users play at a certain scene, for example. Such information can be used as help information for players that have entered the scene. The server device 5 is able to realize an effective help function in response to a request from the user. The server device 5 can dig up potential needs of the user from the playing tendency of the user, and give useful feedback to the game developer.

FIG. 2 illustrates a hardware structure of the information processing device 10. The information processing device 10 has a main power supply button 20, a power supply ON LED (Light Emitting Diode) 21, a standby LED 22, a system controller 24, a clock 26, a device controller 30, a medium drive 32, a USB module 34, a flash memory 36, a wireless communication module 38, a wired communication module 40, a sub-system 50, and a main system 60.

The main system 60 includes a main CPU (Central Processing Unit), a main memory as a main storage device and a memory controller, a GPU (Graphics Processing Unit), and so on. The GPU is mainly used for performing arithmetic processing of game programs. The main CPU has a function to activate an OS (Operating System) and execute game programs installed in the auxiliary storage device 2 in an environment provided by the OS. The sub-system 50 includes a sub-CPU, a main memory as a main storage device and a memory controller, and so on, and is free from a GPU.

The main CPU has a function to execute game programs installed in the auxiliary storage device 2 or a ROM (Read-Only Memory) medium 44, though the sub-CPU does not have such a function. However, the sub-CPU has a function to access the auxiliary storage device 2 and a function to send data to and receive data from the server device 5. As the sub-CPU has such limited processing functions, it can operate with smaller power consumption than the main CPU. The functions of the sub-CPU are performed while the main CPU is standing by.

The main power supply button 20 is an input section where the user enters an operation, and is disposed on a front surface of a casing of the information processing device 10. The main power supply button 20 is operated to turn on or off the supply of electric power to the main system 60 of the information processing device 10. The power supply ON LED 21 is energized when the main power supply button 20 is turned on. The standby LED 22 is energized when the main power supply button 20 is turned off. The system controller 24 detects when the main power supply button 20 is depressed by the user.

The clock 26, which is a real-time clock, generates current data and time information and supplies the generated current data and time information to the system controller 24, the sub-system 50, and the main system 60.

The device controller 30 is constructed as an LSI (Large-Scale Integrated Circuit) that transfers information between devices similarly to a southbridge. As illustrated, devices such as the system controller 24, the medium drive 32, the USB module 34, the flash memory 36, the wireless communication module 38, the wired communication module 40, the sub-system 50, and the main system 60 are connected to the device controller 30. The device controller 30 absorbs the differences between the electric characteristics of the devices and the differences between the data transfer rates of the devices, thereby controlling the timing of data transfer.

The ROM medium 44 stores application software such as games and license information. The medium drive 32 is a drive device for reading out programs, data, or the like from the ROM medium 44 that is inserted therein. The ROM medium 44 is a read-only recording medium such as an optical disc, a magnetooptical disk, a blue-ray disc, or the like.

The USB module 34 is a module for connecting to external devices through USB cables. The USB module 34 may connect to the auxiliary storage device 2 and the camera 7 through USB cables. The flash memory 36 is an auxiliary storage device acting as an internal storage. The wireless communication module 38 performs wireless communication with the input device 6, for example, according to a communication protocol such as the Bluetooth (registered trademark) protocol, the IEEE802.11 protocol, or the like. The wired communication module 40 performs wired communication with an external device, and connects to the network 3 through the AP 8, for example.

Figure 3:
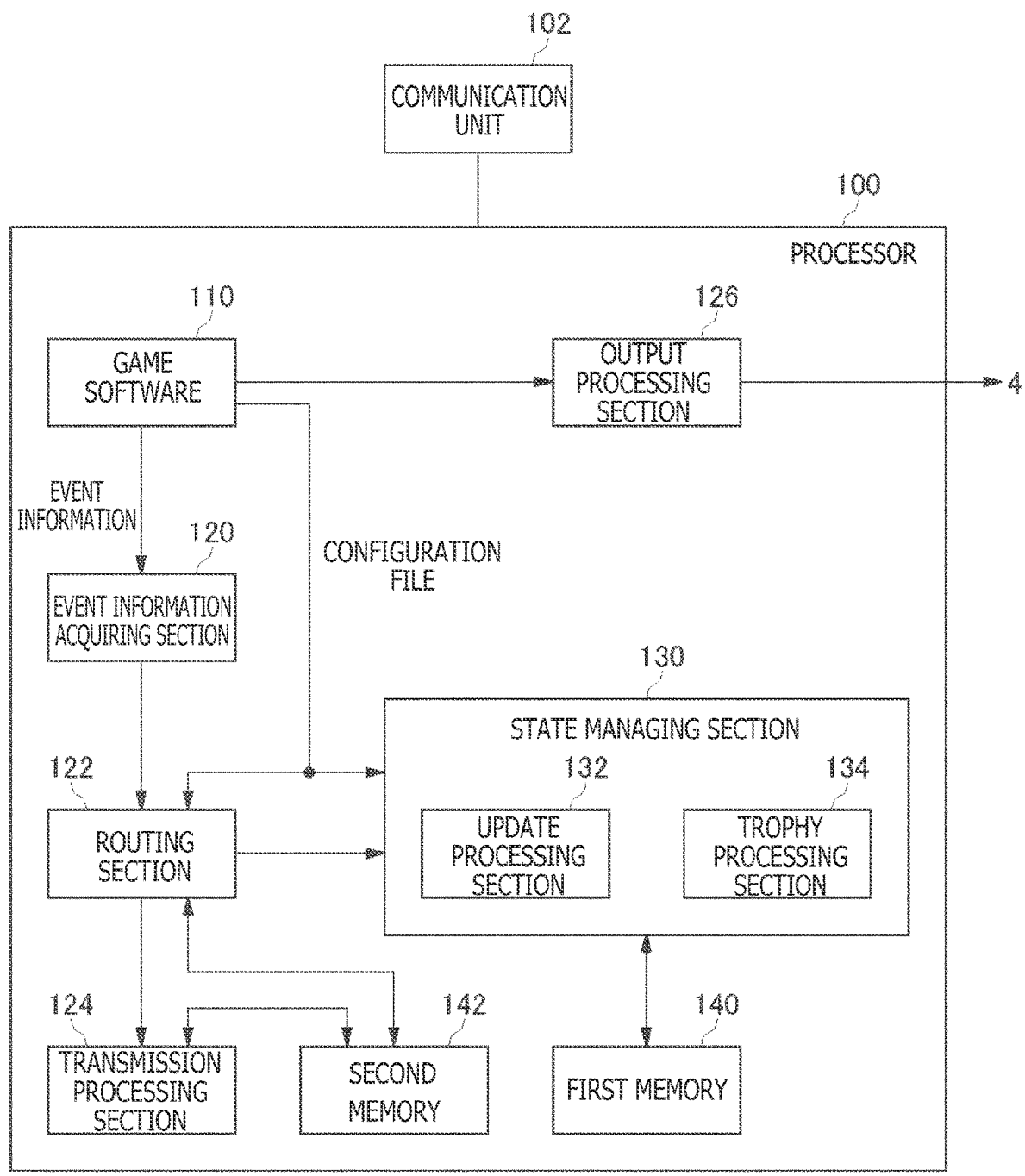
FIG. 3 is a diagram illustrating functional bocks of the information processing device.

FIG. 3 illustrates functional bocks of the information processing device 10. The information processing device 10 includes a processor 100 and a communication unit 102. The processor 100 includes game software 110, an event information acquiring section 120, a routing section 122, a transmission processing section 124, an output processing section 126, a state managing section 130, a first memory 140, and a second memory 142. The state managing section 130 has an update processing section 132 and a trophy processing section 134. The communication unit 102 is arranged to have both the functions of the wireless communication module 38 and the wired communication module 40 in FIG. 2. The wireless communication module 38 is in charge of communication with the input device 6, whereas the wired communication module 40 is in charge of communication with the server device 5.

In FIG. 3, the elements illustrated as the functional blocks for performing various processing sequences may be hardware-implemented by circuit blocks, memories, and other LSI circuits, or may be software-implemented by, for example, programs loaded in memories. These functional blocks may be hardware-implemented only, software-implemented only, or combined-hardware/software-implemented, as can be understood by those skilled in the art, and are not limited to either one of the implemented forms.

The game software 110 includes at least a game program, image data, audio data, and a configuration file. The game program performs an arithmetic processing sequence for moving a player character in a virtual space according to operating information entered by the user through the input device 6. The output processing section 126 generates image data and audio data of the game and outputs the generated image and audio data from the output device 4. The output processing section 126 may include a GPU (Graphics Processing Unit) for performing a rendering process or the like.

When a preset event occurs while the game is in progress, the game program generates event information including an event code that identifies the event that has occurred, and outputs the generated event information to the event information acquiring section 120 that is provided by the system software. The game developer may embed various events in the game, as described below.

Provided a task, a target, an act, or the like that can be performed by the player in the game is referred to as "activity," when the player starts an activity, an event indicating that the activity has been started occurs, and when the player finishes the activity, an event indicating that the activity has been finished occurs. For example, in the case of an activity of "fight" with an enemy character, when the player starts the fight, a fight starting event occurs, and when the player finishes the fight, a fight finishing event occurs.

When the player performs an activity relative to an act, an event indicating that the activity is performed occurs. In the case of a fight activity, for example, when the player defeats an enemy character, an event indicating that the enemy character is defeated occurs. In the case of a motion activity for moving in a village, when the player greets a villager, an event indicating that the villager is greeted occurs. Each event is assigned an event code, and the game program generates event information representing the event code that identifies the event that has occurred, to which game data indicating the state of the game upon occurrence of the event is added. The game program may include the site where the event has occurred, information of the other party, etc., in the game data. For example, with respect to an activity indicating that the player greets a villager, the game data may include at least the site where the player has greeted the villager and information indicating the villager. With respect to an activity indicating that the player defeats an enemy, the game data may include information of the defeated enemy character and an experience value of the player that has increased by defeating the enemy character.

Furthermore, when the player acquires a weapon while playing the game, an event indicating that the player has acquired the weapon occurs. When the player uses the weapon, an event indicating that the player has used the weapon occurs. When a weapon is used on the player by an enemy character, an event indicating that the weapon has been used on the player occurs. The game program generates event information by adding, to the event code, game data indicating the kind of the weapon, the site where the weapon has been acquired or used, etc., and outputs the generated event information to the event information acquiring section 120. The game developer may define various events and embed them in the game.

For the purpose of keeping a motivation for the user, various missions are established in the game. When the user clears a mission, a virtual award, i.e., a trophy, for the mission is given to the user. A condition for unlocking a trophy, i.e., a condition for the user to clear a mission and acquire a trophy, is related to a particular event. For example, in the case where a mission of "greeting 10 villagers" is established for a bronze trophy, the player is given a bronze trophy by greeting 10 villagers. In the case where a mission of "greeting 100 villagers" is established for a silver trophy, the player is given a silver trophy by greeting 100 villagers. In the case where a mission "greeting 500 villagers" is established for a gold trophy, the player is given a gold trophy by greeting 500 villagers. The state managing section 130 determines whether an unlocking condition for a trophy is satisfied.

The configuration file included in the game software 110 describes how event information output from the game and conditions for unlocking trophies are associated with each other. For example, the configuration file describes that a condition for unlocking a bronze trophy is satisfied when an event code indicating that a greeting activity has been performed is output 10 times from the game software 110. Similarly, the configuration file describes that a condition for unlocking a silver trophy is satisfied when an event code indicating that a greeting activity has been performed is output 100 times from the game software 110, and also describes that a condition for unlocking a gold trophy is satisfied when an event code indicating that a greeting activity has been performed is output 500 times from the game software 110.

The configuration file describes information for generating records that manage the progress of trophy unlocking conditions. The records for trophy management will hereinafter be referred to as "stats." The records "stats" are generated in the first memory 140 for recording calculated values of event information relative to trophy unlocking conditions. In the case where the counts of occurrences of greeting activities represent unlocking conditions for bronze, silver, and gold trophies, as described above, records for counting the counts of occurrences of greeting activities are created in the first memory 140 for managing the progress of trophy unlocking conditions.

When the state managing section 130 is provided with the configuration file from the game software 110, the state managing section 130 generates records, i.e., stats, for trophy management in the first memory 140.

FIG. 4 illustrates an example of a stats table generated in the first memory 140. The stats table includes various records related to trophy unlocking conditions. In FIG. 4, values of the respective records have already been entered.

The value of the record "greeting" represented by starts ID "1" indicates the number of times that the event code of greeting activities has been output. As described above, the count of greeting activities represents unlock conditions for bronze, silver, and gold trophies. When the event code of a greeting activity is output from the game software 110, the update processing section 132 increments the value of the record of starts ID "1" by 1.

The value of the record "defeating enemy" represented by starts ID "2" indicates the number of times that the event code of enemy defeating activities has been output. In this example, defeating a predetermined number of enemy characters is established as a mission for acquiring a trophy. When the event code of an enemy defeating activity is output from the game software 110, the update processing section 132 increments the value of the record of starts ID "2" by 1.

The value of the record "experience value" represented by starts ID "3" indicates the sum of experience values included in the game data ancillary to the event code. In this example, reaching a predetermined experience value is established as a mission for acquiring a trophy. The update processing section 132 adds experience values included in the game data, updating the value of the record of starts ID "3."

The configuration file from the game software 110 includes a list of event codes related to unlocking of trophies. The code list is given to the routing section 122 before the game is played. When the event information acquiring section 120 acquires event information from the game software 110, the event information acquiring section 120 adds acquired date and time information to the event information, and transfers the resultant information to the routing section 122. Data and time information may be added when the game software generates event information. When provided with the event information, the routing section 122 supplies all the event information to the transmission processing section 124, and supplies the event information related to the unlocking of trophies to the state managing section 130 according to the code list.

The update processing section 132 updates the record corresponding to the event information on the basis of the association between event information and records included in the configuration file. As described above, when the update processing section 132 acquires the event code of a greeting activity, the update processing section 132 increments the count value of the record of corresponding starts ID "1" by 1, thereby updating the record.

As described above, the update processing section 132 according to the embodiment updates the count value of a record included in the stats table for trophy management according to the acquired event information. The trophy processing section 134 determines whether an unlocking condition for a trophy is satisfied on the basis of the value of the record recorded in the stats table.

When the value of a record satisfies an unlocking condition for a trophy, the trophy processing section 134 gives the trophy to the user. For example, when the record value of stats ID "1" reaches 10, the trophy processing section 134 decides that the bronze trophy is unlocked, and gives the bronze trophy to the user. The record value of stats ID "1" subsequently remains to be monitored by the trophy processing section 134. When the record value of stats ID "1" reaches 100, the trophy processing section 134 decides that the silver trophy is unlocked, and when the record value of stats ID "1" reaches 500, the trophy processing section 134 decides that the gold trophy is unlocked.

When the trophy processing section 134 decides that an unlocking condition for a trophy is satisfied, the trophy processing section 134 may display notice information indicating that the user has acquired the trophy in the game screen while the game is being played. The user is now able to know the acquisition of the trophy.

The routing section 122 supplies all the event information to the transmission processing section 124, and the transmission processing section 124 sends the supplied event information from the communication unit 102 to the server device 5. Therefore, the server device 5 collects all the event information produced in the game play. As all the event information is sent to the server device 5, the server device 5 in the information processing system 1 is also able to determine whether an unlocking condition for a trophy is satisfied.

The trophy unlocking process should preferably be carried out in real time. In the case where the server device 5 is in charge of the unlocking process, the server device 5 and the information processing device 10 need to be connected to each other online with a minimum communication delay at all times. However, if the communication line or the server device 5 happens to malfunction temporarily, the server device 5 is unable to unlock a trophy in real time. Consequently, even when the user has acquired a trophy by clearing a mission, the notice of the acquisition of the trophy is not displayed on the game screen, which is not undesirable. In the information processing system 1 according to the present embodiment, the state managing section 130 of the information processing device 10 manages unlocking of trophies, allowing the user to acquire a trophy in real time even if the server device 5 and the information processing device 10 are disconnected from each other.

According to the embodiment, the state managing section 130 generates the stats table for trophy management in the first memory 140 and manages the progress of trophy unlocking conditions on the basis of the values of the respective records in the stats table. Furthermore, by recording all the event information output from the game software 110, it is also theoretically possible for the state managing section 130 to refer to the recorded event information to unlock a trophy.

Specifically, in the information processing device 10, the second memory 142 is arranged to accumulate event information. For example, in the case where the transmission processing section 124 is unable to immediately send event information to the server device 5, the routing section 122 may accumulate event information in the second memory 142, and the transmission processing section 124 may send the event information accumulated in the second memory 142 to the server device 5 at such a timing that the transmission processing section 124 becomes able to send event information.

However, the capacity of the second memory 142 is limited, and the second memory 142 may not accumulate all the event information when the game is played continuously for a long period of time. For example, in the case where the second memory 142 is a ring buffer, when the event information accumulated in the second memory 142 exceeds a predetermined amount, older event information is successively overwritten by newer event information in the second memory 142. In the information processing device 10, since all the event information that has been generated cannot be recorded in the second memory 142, it is difficult to unlock a trophy by referring to the recorded information in the second memory 142. The stats table generated in the first memory 140 for managing the progress of trophy unlocking conditions is effective to avoid the above difficulty.

With the progress of trophy unlocking conditions being managed in the first memory 140, the trophy processing section 134 can present the progress of trophies to the user without activating the game software 110. For example, the trophy processing section 134 may display the progress of trophies as "YOU CAN ACQUIRE SILVER TROPHY BY GREETING FIVE MORE VILLAGERS" with respect to the activity of greeting villagers.

The state managing section 130 according to the embodiment stores not only the stats table, but also the latest state information indicating the playing details of the user, in the first memory 140. The update processing section 132 updates the state information on the basis of the event information. For example, the update processing section 132 may manage the playing details of the user according to the following state information:

Activity that has started recently
Activity that has been played so far
Activity that has been cleared so far
Activity that can be played
Activity that cannot be played The update processing section 132 updates the state information relative to an activity when it is supplied with event information from the routing section 122. As the update processing section 132 manages the latest state information relative to activities, a motion picture distribution server, not illustrated, can remove a moving image indicating the clearing of an activity that the user has not completed from distribution candidates for the information processing device 10 for the purpose of preventing spoilers.

The present invention has been described above on the basis of the embodiment. The embodiment is given by way of example only, and various changes and modifications can be made in combinations of components of the embodiment and processing processes thereof and fall within the scope of the invention, as can be understood from the those skilled in the art.

INDUSTRIAL APPLICABILITY

The present invention is applicable to a technical field for managing events in an application.

REFERENCE SIGNS LIST

1: Information processing system
5: Server device
10: Information processing device
100: Processor
102: Communication unit
110: Game software
120: Event information acquiring section
122: Routing section
124: Transmission processing section
126: Output processing section
130: State managing section
132: Update processing section
134: Trophy processing section
140: First memory
142: Second memory.

The invention claimed is:

1. An information processing device comprising:
an event information acquiring section that, in a case where a respective event occurs among a plurality of different events in game software being executed, acquires, from the game software, event information including: (i) a respective event code that identifies the respective event that has occurred resulting from a player engaged in gameplay; and (ii) game data indicating a respective state of the game software at a respective time of occurrence of the respective event;
a transmission processing section that sends the acquired event information to outside;
an update processing section that updates a record associated with the acquired event information, including updating: (i) a respective value of the record associated with the respective event generated according to a configuration file of the game software, in accordance with the acquired event information, and the value of the record is an incrementing count of a number of times that the respective event code occurs in the event information over a period of time, and (ii) game state information based on the game data indicating the respective state of the game software at the respective time of occurrence of the respective event; and
an award processing section that operates to grant a virtual award to a user during the execution of the game software, the grant occurring when a value of the record satisfies an unlocking condition for the virtual award.

2. The information processing device according to claim 1, wherein the update processing section updates a count value of the record in accordance with the number of times that the respective event code occurs, such that the incrementing count increases by one count value for each time that the respective event occurs in a given time period.

3. An information processing method comprising:
acquiring, in a case where a respective event occurs among a plurality of different events in game software being executed, event information from the game software including: (i) a respective event code that identifies the respective event that has occurred resulting from a player engaged in gameplay; and (ii) game data indicating a respective state of the game software at a respective time of occurrence of the respective event;
sending the acquired event information to outside;
updating a record associated with the acquired event information, including updating: (i) a respective value of the record associated with the respective event generated according to a configuration file of the game software, in accordance with the acquired event information, and the value of the record is an incrementing count of a number of times that the respective event code occurs in the event information over a period of time, and (ii) game state information based on the game data indicating the respective state of the game software at the respective time of occurrence of the respective event; and
granting a virtual award to a user during the execution of the game software, the grant occurring when a value of the record satisfies an unlocking condition for the virtual award.

4. A non-transitory, computer readable storage medium containing a computer program, which when executed by a computer, causes the computer to perform an information processing method by carrying out actions, comprising:
acquiring, in a case where a respective event occurs among a plurality of different events in game software being executed, event information from the game software including: (i) a respective event code that identifies the respective event that has occurred resulting from a player engaged in gameplay; and (ii) game data indicating a respective state of the game software at a respective time of occurrence of the respective event;
sending the acquired event information to outside;
updating a record associated with the acquired event information, including updating: (i) a respective value of the record associated with the respective event generated according to a configuration file of the game software, in accordance with the acquired event information, and the value of the record is an incrementing count of a number of times that the respective event code occurs in the event information over a period of time, and (ii) game state information based on the game data indicating the respective state of the game software at the respective time of occurrence of the respective event; and granting a virtual award to a user during the execution of the game software, the grant occurring when a value of the record satisfies an unlocking condition for the virtual award.

\* \* \* \* \*